(12) United States Patent
Wrobel et al.

(10) Patent No.: US 6,454,278 B1
(45) Date of Patent: Sep. 24, 2002

(54) COUNTER CENTRIFUGAL POWER CHUCK ASSEMBLY

(76) Inventors: Donald J. Wrobel, 7973 S. Shoreside Dr., Traverse City, MI (US) 49684-9569; Carlson Waite, 7280 Sandford Rd., Howell, MI (US) 48843; Ralph J. Gonnocci, 1130 Cobridge Dr., Rochester, MI (US) 48306

(*) Notice: Subject to any disclaimer, the term of this patent is extended or adjusted under 35 U.S.C. 154(b) by 0 days.

(21) Appl. No.: 09/657,878

(22) Filed: Sep. 8, 2000

(Under 37 CFR 1.47)

(51) Int. Cl.[7] .......................... B23B 31/14; B23B 31/18
(52) U.S. Cl. ....................... 279/130; 279/106; 279/119; 279/121
(58) Field of Search ................. 279/110, 119, 279/120, 121, 123, 130, 140, 106–108

(56) References Cited

U.S. PATENT DOCUMENTS

| | | | | |
|---|---|---|---|---|
| 3,984,114 A | * | 10/1976 | Ovanin | 279/119 |
| 4,047,723 A | * | 9/1977 | Buck | 279/130 |
| 4,097,053 A | * | 6/1978 | Steinberger | 279/130 |
| 4,240,645 A | * | 12/1980 | Rohm | 279/130 |
| 4,465,289 A | * | 8/1984 | Banks | 279/130 |
| 4,667,970 A | * | 5/1987 | Pruden | 279/130 |
| 5,060,957 A | * | 10/1991 | Stolzenberg et al. | 279/1 C |
| 5,184,833 A | | 2/1993 | Cross et al. | |
| 5,322,305 A | | 6/1994 | Cross et al. | |
| 5,409,242 A | | 4/1995 | Gonnocci | |
| 5,941,538 A | | 8/1999 | Gonnocci | |

OTHER PUBLICATIONS

Gettleman, Ken, "Getting The Grip On High Speed Turning", Modern Machine Shop, Jul. 1977, pp. 76–83.
Cushman Industries Drawing #91–580–12–218A, Nov. 5, 1975.
SP Manufacturing Catalogue, Aug. 1990, pp. 2–5 and 2 attachments, 126C.
Rohm Catalogue, p. 10.
Klopfer Catalogue, p.15.
SMW Autoblok General Catalogue, 2000, pp. 50–51.
Ultra–Grip Prior Design, Jul. 1998.
Ultra–Grip Prior Design, Sep. 1997.

* cited by examiner

Primary Examiner—Steven C. Bishop
(74) Attorney, Agent, or Firm—Dobrusin & Thennisch PC

(57) ABSTRACT

A power chuck assembly for securing a workpiece as the chuck assembly moves or rotates the workpiece is disclosed. The assembly includes a body portion, at least two gripping members and at least two counterweights wherein said counterweights operate to assist in securing a workpiece upon the chuck assembly.

13 Claims, 3 Drawing Sheets

COUNTER CENTRIFUGAL POWER CHUCK ASSEMBLY

FIELD OF THE INVENTION

The present invention relates generally to a power chuck assembly, which is typically used for securing a workpiece. More particularly, the present invention relates to a power chuck assembly having a counter weight, which assists the chuck assembly in securing a workpiece during rotation.

BACKGROUND OF THE INVENTION

A power chuck assembly generally secures a workpiece in a particular position between gripping members which may be clamps, jaws, rocker arms or the like. Once a workpiece is secured within the power chuck assembly, the chuck assembly typically rotates upon a spindle or other device so that the workpiece may be altered, manipulated or worked upon in some fashion. As the chuck assembly rotates, centrifugal force may tend to force the gripping members or the like radially outward thereby loosening the grip of the members upon the workpiece. There is therefore a need for a chuck assembly with gripping members which can help resist or "counter" any outward centrifugal force placed upon such members.

SUMMARY OF THE INVENTION

A primary object of the present invention is to provide a power chuck assembly having gripping members designed to resist or "counter" any outward or centrifugal force that may be placed on a chosen workpiece while it is retained within the power chuck assembly. The power chuck assembly disclosed in the present invention includes a body having a first and second opening, a first gripping member which is disposed within the first opening and which is rotatably disposed about a first pivot axis. The first gripping member is further defined as having a first end and a second end radially disposed about the pivot axis, the first end being suitable for assisting in the support of a workpiece placed within the power chuck assembly.

A further object of the present invention is to provide a power chuck assembly which utilizes a first counter weight operatively adjacent to the second end and a second gripping member which is disposed within the second opening and which is rotatably disposed about a second pivot point. The second gripping member is further defined as having a third end and a fourth end radially disposed about the second pivot point whereby the third end serves to assist in the support of the workpiece.

These and other objects, aspects, and advantages of the present invention will become apparent upon reading the following detailed description in combination with the accompanying drawings.

DETAILED DESCRIPTION OF PREFERRED EMBODIMENTS

Figure 1:
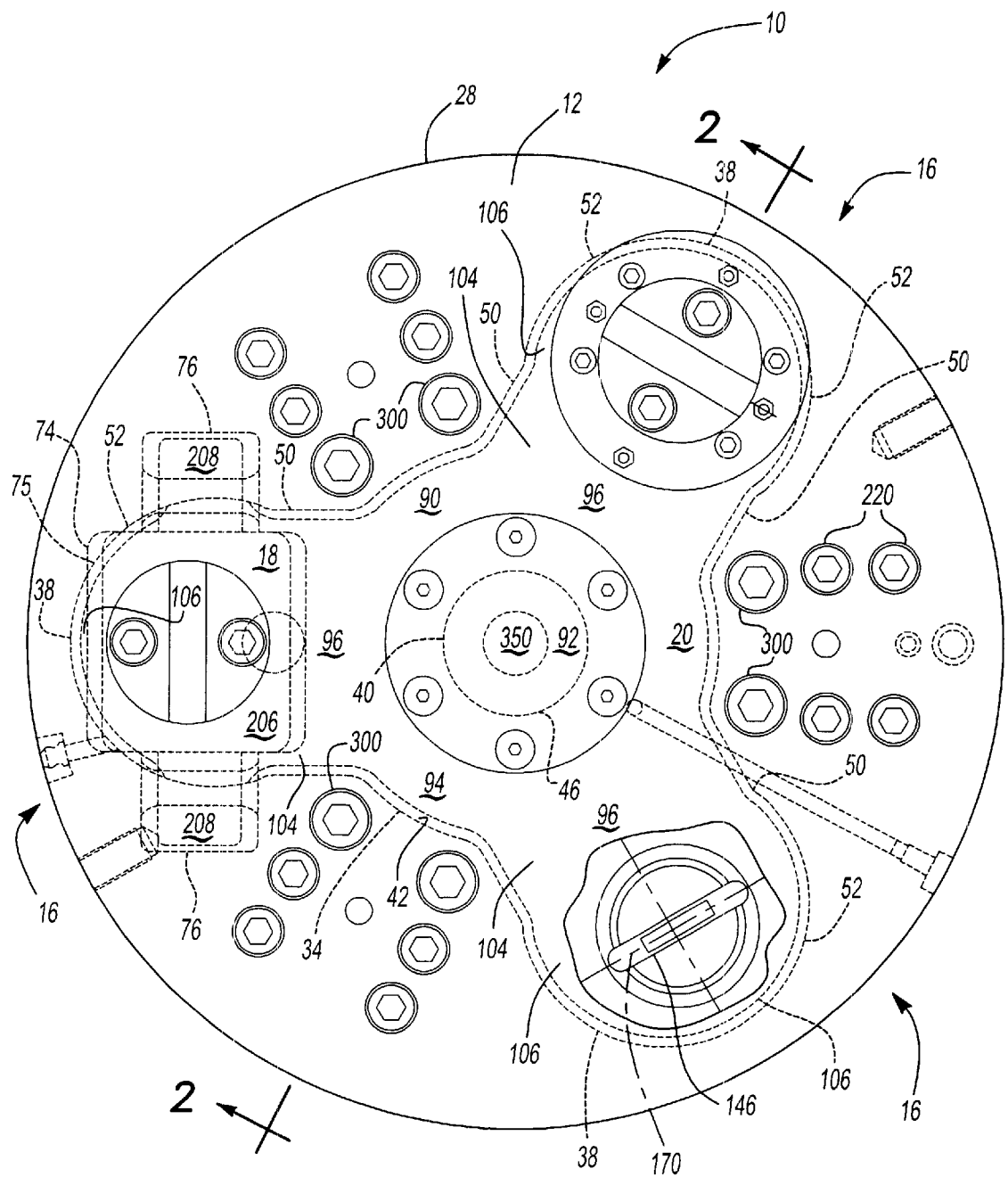
FIG. 1 illustrates a top view of a power chuck assembly according to one embodiment of the present invention.
Figure 2:
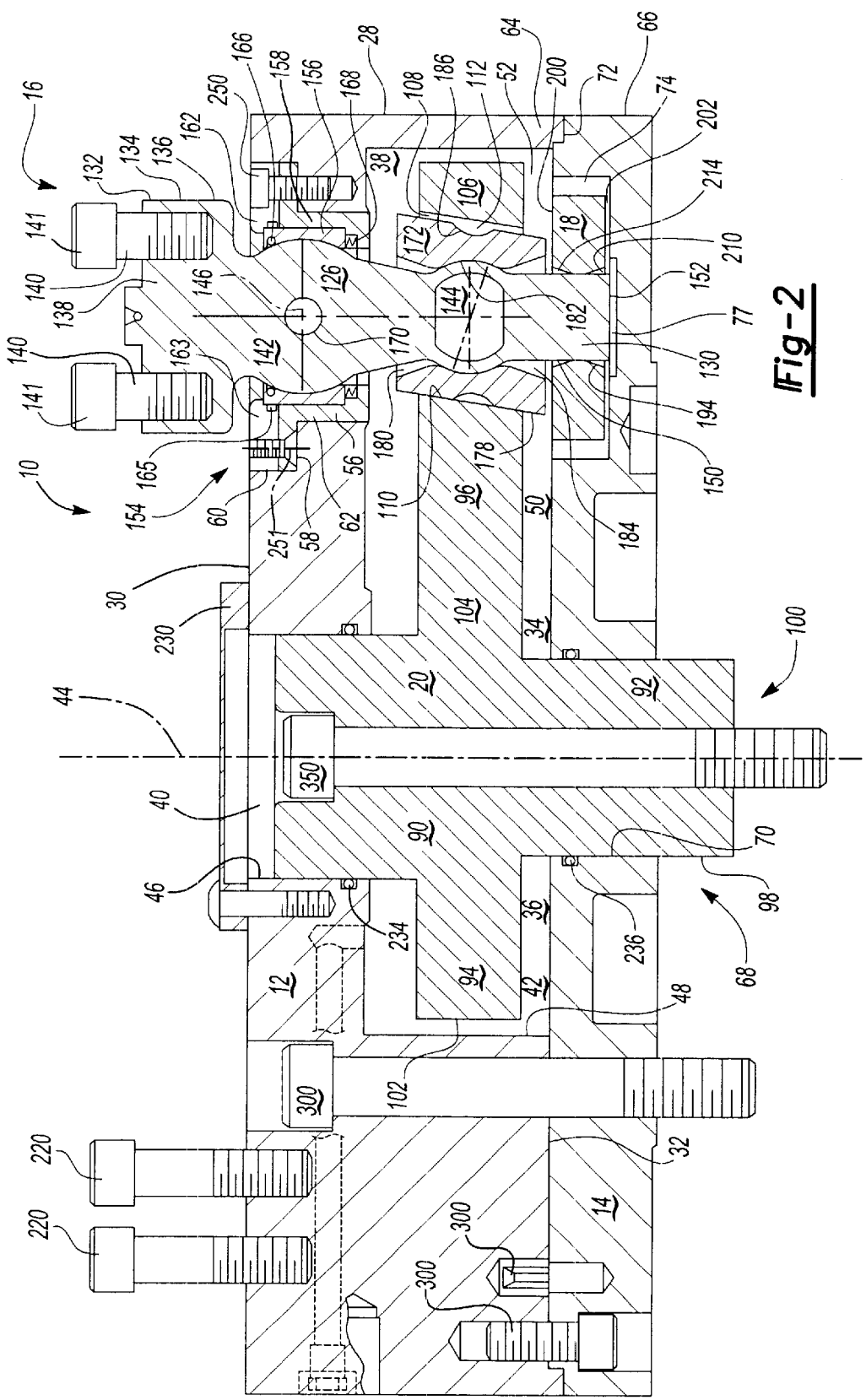
FIG. 2 illustrates a sectional side view of the power chuck assembly of FIG. 1 along line 1—1.
Figure 3:
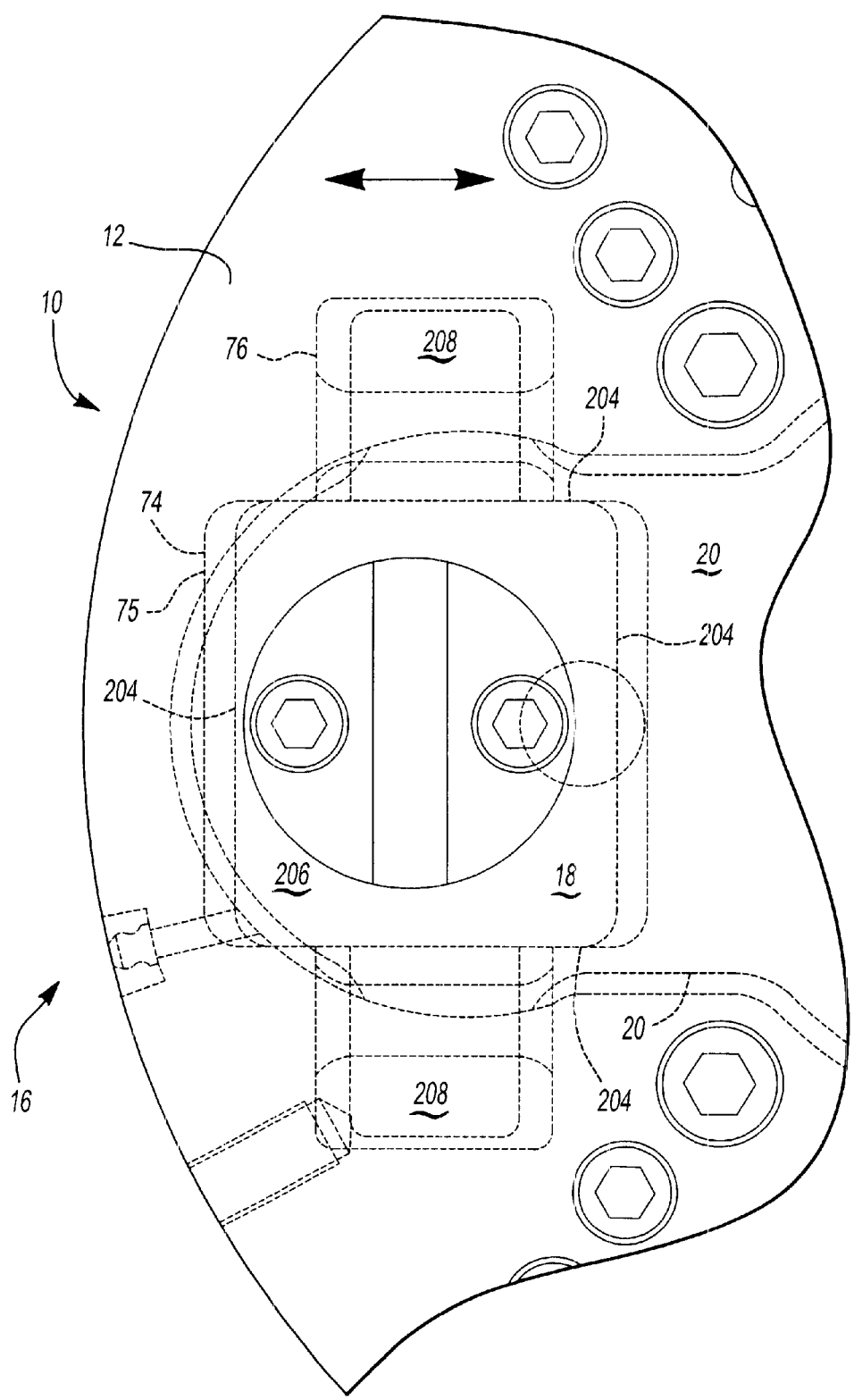
FIG. 3 illustrates a top view of a portion of the power chuck assembly of FIG. 1.

Referring now to FIGS. 1–3, there is illustrated a power chuck assembly 10 according to a non-limiting embodiment of the present invention. In the non-limiting embodiment shown, the power chuck assembly 10 includes a body portion 12, an adapter plate 14, a plurality of gripping member assemblies 16, a plurality of counterweights 18 and an actuator 20.

It should be noted that, although FIG. 1 is a top view of the chuck assembly 10, there are three substantially identical gripping member assemblies 16, which are at least partially shown. However, in FIG. 1, various portions of the gripping member assemblies 16, the adapter plate 14, or the counterweights 18 have been shown at or near each of the locations of the gripping member assemblies 16 and have sometimes been shown in phantom or in cross-section in order to further the understanding of the present invention.

In a non-limiting embodiment of the present invention, the body portion 12 is generally cylindrical and includes an outer annular peripheral surface 28 extending between a generally flat first, front or top surface 30 and a generally flat second, back or bottom surface 32. The body portion 12 includes a cavity 34 that extends into the body portion 12 through the second surface 32. The cavity 34 is shown in cross-section in FIG. 2 and is indicated by a phantom dashed line 34 in FIG. 1. In the non-limiting embodiment shown, the cavity 34 includes a generally open central portion 36 with a plurality (at least two but preferably three or more) of radially extending open portions 38 extending from the open central portion 36.

The open central portion 36 includes a generally elongated cylindrical open portion 40 which extends up to and through the first surface 30 and a generally annular shaped open portion 42 which surrounds at least a portion of the cylindrical open portion 40. The cylindrical open portion 40 and the annular shaped portion 42 are shown with phantom dashed line in FIG. 1 and in cross-section in FIG. 2. Furthermore the cylindrical open portion 40 and the annular shaped portion 42 are generally concentric about a longitudinal axis 44 which is generally, in the non-limiting embodiment shown, the central axis 44 of the body 12 and of the chuck assembly 10. The cylindrical portion 40 and the annular shaped portion 42 are also respectively at least partially defined by annular surfaces 46, 48 of the body portion 12. Further defining the cavity 34, the peripherally extending open portions 38 of the cavity 34 include a generally rectangular portion 50 and a generally hemispherical portion 52.

The body portion 12 also includes a plurality (at least two, but preferably three or more) of holes or apertures 56 which extend through the first surface 30 and the body portion 12 to each of the peripherally extending open portions 38. In the embodiment shown, the holes 56 are stepped or have a horizontal annular surface 58 between a first and second vertical annular surface 60, 62.

Furthermore, in the non-limiting embodiment shown, the body 12 includes a protrusion or ridge 64. The protrusion 64 is annular and is adjacent to and extends with the outer peripheral surface 28 of the body portion 12 at or near the second surface 32 of the body portion 12.

It shall be appreciated that the body portion 12 is illustrated and described in great detail, however, various changes to the shape or general design of the body portion 12 may be made without departing from the scope of the present invention.

As shown in the non-limiting embodiment of FIGS. 1 and 2, the adapter plate 14 is generally cylindrical or "disk-shaped" and includes an outer peripheral and/or annular surface 66. The adapter plate 14 includes a hole 68, which extends through the adapter plate 14. In a non-limiting embodiment, the hole 68 is generally cylindrical with an annular surface 70 and the hole 68 is centrally located on the adapter plate 14. The adapter plate 14 also includes an annularly recessed portion 72 adjacent to and extending with the outer peripheral surface 66 of the plate 14. In a non-limiting embodiment of the invention, the adapter plate 14 includes a plurality (at least two, but preferably three or more) cavities 74, which are shown in cross-section in FIG. 2 and are shown in phantom dashed lines in FIGS. 1 and 3. The cavities 74 include a generally rectangular portion 75, a pair of "flange-shaped" portions 76 and a clearance cavity 77. It shall be appreciated that the adapter plate 14 is illustrated and described in great detail, however, various changes to the shape or general design of the adapter plate 14 may be made without departing from the scope of the present invention.

In a non-limiting embodiment, the actuator 20 of the chuck assembly 10 is shown in a phantom dashed line in FIG. 1 and is cross-section in FIG. 2. In the non-limiting embodiment shown the actuator includes a central portion 90 and a plurality (at least two, but preferably three or more) flanges or protrusions 96 extending from the central portion 90. The central portion 90 of the actuator 20 includes a generally cylindrical portion 92 and a generally annular portion 94. The cylindrical portion 92 is generally elongated and includes an outer cylindrical surface 98 and a hole 100, which extends through the center of and is generally concentric with the cylindrical portion 92 and/or the outer cylindrical surface 98 about the axis 44. The annular portion 94 includes an outer annular or cylindrical surface 102. In the embodiment shown, the annular portion 94 at least partially surrounds and is integrally formed with or attached to a portion of the outer cylindrical surface 98 of the cylindrical portion 92 and extends outwardly, perpendicularly, radially and/or peripherally from the outer cylindrical surface 98 of the cylindrical portion 92.

The flanges or protrusions 96 of the actuator 20 extend radially away from the outer cylindrical or annular surfaces 98, 102 of the first and second cylindrical portions 92, 94. In a non-limiting embodiment, the flanges or protrusion 96 each include a generally rectangular shaped portion 104 and a hemispherical portion 106. Further, in a non-limiting embodiment, each flange 96 includes a hole or aperture 108, which extends through the flange 96. In the non-limiting embodiment shown, the hole 108 is at least partially defined by a camming surface 110, which is disposed at an angle to the axis 44. In a non-limiting embodiment, the angle is approximately ten (10) degrees. The camming surface 110 may contact a separate member 112, which resides in the hole 108. It shall be appreciated that the actuator 20 is illustrated and described in great detail, however, various changes to the shape or general design of the actuator 20 may be made without departing from the scope of the present invention.

The chuck assembly 10 further includes the plurality of gripping member assemblies 16. In the embodiment shown, the gripping member assemblies 16 include gripping members 126 which are, as they are referred to in the art, ball chucks or rocker arms. The gripping members 126 are generally elongated and extend between a proximate and a distal end 130, 132. The distal end 132 includes a generally enlarged cylindrical portion 134 having an outer peripheral surface 136, a generally flat surface 138 and a pair of holes, apertures, recesses or cavities 140 which extend through the flat surface 138 and into the cylindrical portion 134 and receive fasteners 141 such as screws. It shall be recognized that the distal end 132 of the gripping member 126 may be adapted to assist in supporting numerous members or devices such as jaws for gripping workpieces.

The gripping members 126 further include a first or upper and a second or lower adjustment portion 142, 144 about which the ends 130, 132 are radially disposed. In a non-limiting embodiment, the first adjustment portion 142 is generally spherical or ball shaped and includes a hole or aperture 146 extending through the portion 142. The second adjustment portion 144 is also generally spherical shaped and include two flat surfaces. The proximate end 130 of the gripping members 126 is generally cylindrical with an outer peripheral surface 150 that ends at a generally flat surface 152.

In the non-limiting embodiment, the gripping member assemblies 16 further include a supporting assembly 154. The supporting assembly 154 includes a bearing member 156, which surrounds the first adjustment portion 142 of the gripping member 126. In a non-limiting embodiment, the bearing member 156 is a single fracture split member, which is disposed about the first adjustment portion 142 of the gripping member 126. A seal 166 (e.g., an O-ring) is disposed in a groove of the bearing member 156, and the seal contacts the first adjustment portion 142 of the gripping member 126. In the non-limiting embodiment shown, the supporting assembly 154 further includes a lower member 158, which has an upper and lower flange. An upper annular ring member 162 and a circular spring bearing 168.

In a non-limiting embodiment, the upper annular member 162 includes a shoulder portion 163, which prevents the bearing member 156 from exiting the supporting assembly 154. Furthermore, a seal 165 (e.g., an O-ring) is disposed in a groove of the upper annular ring member 162 between the upper annular ring member 162 and the bearing member 156.

In a further non-limiting embodiment, the circular spring bearing 168 is a pulldown or wave spring although any suitable spring bearing 168 may be used. In the embodiment shown, the spring bearing 168 provides resistance to control pull back of the gripping members 126 during chucking and to push forward the gripping members 126 during unchucking.

Also included in each gripping member assembly 16 is a support or rotation member 170 extending through the hole 146 in the adjustment portion 142 so that the adjustment portion 142, and therefore the gripping member 126 can at least partially rotate around the rotation member 170. In the embodiment shown, the bearing member 156 has a generally concave surface, which allows the adjustment portion 142 to rotate around the support or rotation member[s] 170 while the bearing member 156 and/or the rotation member 170 support the gripping member 126. In the non-limiting embodiment shown, the rotation member 170 includes two pins on either side of a spring, and the spring urges the pins into holes in the bearing member 154 and/or the lower member 158. However, other rotation members 170 may be used, and it is contemplated that no rotation member 170 may be used. In a particular non-limiting embodiment, the spring between the pins of the rotation member 170 is a homing spring that allows the pins to move toward each other and disengage the holes of the bearing member 156 as the gripping member 126 rotates. Further, the homing spring allows the pins to move away from each other and into the holes of the bearing member 156 and/or lower member 158 when the holes of the member 156 and the pins are aligned.

The gripping member assemblies 16 also include a slide member 172. In a non-limiting embodiment, the slide member 172 is generally cylindrical with a central opening 184. The slide member 172 includes an outer annular camming surface 178 and an inner annular surface 180. The inner annular surface 180 includes a generally concave portion 182 and the outer annular surface 178 is generally disposed at an angle relative to the central axis 44. The outer annular surface also includes a cavity 186.

It shall be appreciated that the gripping member assemblies 16 are illustrated and described in great detail, however, various changes to the shape or general design of the gripping member assemblies 16 may be made without departing from the scope of the present invention.

Referring to FIGS. 1 and 2 and 3 there is illustrated the counter weight 18 of the chuck assembly 10 in cross-section and in phantom top view and referring specifically to FIG. 3, there is a magnified top view of the counter weight 18 in phantom. In the non-limiting embodiment shown, the counter weight 18 is generally flat with a first and second generally flat surface 200, 202 and four sides 204. The counter weight 18 includes a generally rectangular portion 206 and a pair of flanges 208 extending away from opposing sides 204 of the rectangular portion 206. The counterweight 18 also includes a hole or aperture 210, which is generally centralized upon the weight 18 and extends through the rectangular portion 206 of the counter weight 18. The hole or aperture 210 is at least partially defined by a double beveled surface 214 of the counter weight 18. It shall be appreciated that the counter weight 18 is illustrated and described in great detail, however, various changes to the shape or general design of the counter weight 18 may be made without departing from the scope of the present invention. For example, the gripping member 126 may have a convex portion at the distal end 130 of the member 126 that mates with a concave portion of the weight 18.

The chuck assembly 10 may include other parts as well. For example, the chuck assembly 10 may include conventional bolts 220. The chuck assembly 10 may also include a cap or lid portion 230, which is optionally placed over the cylindrical open portion 40 and is attached with conventional fasteners such as screws to the body portion 12 thereby protecting the cylindrical open portion 40 from receiving debris.

In a further non-limiting embodiment, a seal 234 such as an O-ring is disposed in a groove in the annular surface 46 of the hole 40 in the body portion 12 and a seal 236 is disposed in a groove in the annular surface 70 of the hole 68 of the adapter plate 14.

It shall be understood that according to the present invention, the body portion 12, the adapter plate 14, the plurality of gripping member assemblies 126, the counter weight 18 and the actuator 20 may be formed using a variety of different materials and a variety of different forming techniques. In one non-limiting embodiment the body 12, the adapter plate 14, the plurality of gripping members 126, the counter weight 18 and the actuator 20 are die cast in a conventional manner from iron steel or other metal.

ASSEMBLY

Referring now to FIGS. 1 and 2, one non-limiting manner in which the power chuck assembly 10 may be assembled is discussed. In a non-limiting embodiment, the actuator 20 of the chuck assembly 10 is placed within the cavity 34 of the body 12 of the assembly 10. In particular, the cylindrical portion 92 of the actuator 20 is slidably received in the cylindrical open portion 40 of the cavity 34. Notably, a portion of the annular surface 98 of the cylindrical portion 92 is in slidable or translatable contact with the annular surface 46 of the body portion 12 in a manner that allows the cylindrical portion 92 to be translated along the central axis 44, but helps restrict or prohibit translations or movements of the cylindrical portion 92 in directions which are skew to the central axis 44.

As the cylindrical portion 92 is inserted, disposed or received into the cylindrical open portion 40, the annular portion 94 of the actuator 20 is inserted, disposed or received within the open annular portion 42 of the cavity 34 of the body portion 12. Furthermore the protrusions 96 of the actuator 20 are inserted, disposed or received in the peripherally extending open portions 38 of the cavity 34.

The gripping member assemblies 16 are received or positioned in the axially spaced holes 56 of the body portion 12 and in the holes 108 of the protrusions 96 of the actuator 20. In particular, the slide member 172 of each gripping member assembly 16 is received into one of the axial holes 108 of the actuator and the upper support assembly 154 is inserted into the axial hole 56 of the body portion 12. It shall be noted, that the two flat surfaces of the lower adjustment portion 144 may be used to create clearance such that the lower adjustment portion 144 may be received in the slide member 172 and the gripping member 126 may be rotated such that the lower adjustment portion 144 properly mates with the concave portion 182 of the slide member.

In the embodiment shown, the support assembly 154 and the gripping member 126 are positioned in the hole 56 of the body portion 12 such that the rotational member 170 is disposed perpendicularly to the central axis 44. Furthermore, one of the flanges of the lower member 158 is disposed or seated upon the lateral annular surface 58 of the hole 56 of the body portion 12 to support the member 160. The other flange of the lower member 158 is under the bearing member 156 and the spring bearing 168, thereby supporting the bearing member 156, and the spring bearing 168 which, in turn supports the adjustment portion 142 of the gripping member 126. The upper annular member 162 rests upon the upper flange of the lower member 158 and conventional fasteners 251 attach the upper annular member 162 to the lower member 158.

The support assembly 154 is attached to the body portion 12 of the chuck assembly 10 with one or more conventional fasteners 250 (e.g., bolts) which extend through holes in the upper annular member 162, the upper flange of the lower member 158, the lateral annular surface 58 of the body portion 12 and into the body portion 12.

As stated, the slide member 172 of the gripping member assembly is inserted into the axial hole 108 of the flange or protrusion 96 of the actuator 20, and therefore, the second adjustment portion 144 is also at least partially within the hole 108 of the flange or protrusion 96. In the embodiment shown, the camming annular surface 110 of the hole 108 in the flange or protrusion 96 mates with the camming annular surface 178 of the slide members, such that the annular surface 110 of the hole 108 is in a slidable relationship relative to the annular surface 178 of the slide member 172, and such that the annular surfaces 110, 178 are both disposed at substantially the same angle to the central axis 44. Furthermore, the member 112 is received in the cavity 186 of the slide member 172 such that the member 112 is in slidable relation with the annular camming surface 110 as well, and thereby assists to secure the slide member 172 in the hole 108 of the actuator 20 and therefore movably secure the lower adjustment portion 144 in the slide member 172. The member 112 may extend partially or fully around the slide member 172.

In a further non-limiting embodiment, the counterweights 18 are placed within the peripheral or radial cavities 74 of the adapter plate 14. Particularly, in the embodiment shown, the counter weights 18 are placed in the cavities 74 such that the rectangular portions 206 of the counter weights 18 are generally placed within the rectangular portions 75 of the cavities 72 and such that the flanges 208 of the counter weights 18 are generally placed in the flanges 76 of the cavities 72.

Thereafter, in the non-limiting embodiment, the adapter plate 14 is attached to the body portion 12 thereby enclosing a substantial portion of the actuator 20 within the cavity 34. In the particular embodiment shown, the adapter plate 14 is aligned upon the body portion 12 of the chuck assembly such that the proximate ends 130 of the gripping members 126 are inserted into the holes 210 of the counter weights 18 such that the counter weights 18 are operatively adjacent the proximate ends 130 of the gripping members 126. Furthermore the adapter plate 14 is positioned on the body portion 12 so that the cylindrical portion 92 of the actuator 20 is slidably received in the hole 68 of the adapter plate 14 and so that the recessed portion 72 of the adapter plate 14 receives or mates with the protrusion or edge 64 of the body portion 12.

Also in the particular embodiment shown, the body 12 is secured to the adapter plate 14 in a conventional manner with a plurality of fasteners 300. The fasteners 300 shown in FIG. 2 are conventional bolts or other fasteners, which threadably fasten the body 12 to the plate 14. It shall be recognized by the person of skill in the art that a variety of devices and/or techniques may be used to fasten the body 12 to the plate 14.

OPERATION

Referring again to FIGS. 1 and 2, the manner in which the power chuck assembly 10 operatively assists in securing a workpiece and the manner in which such workpiece is moved or rotated shall be discussed. Generally, to secure a workpiece upon the chuck assembly 10, the distal ends 132 of the gripping members are moved axially outward and a workpiece is placed between two or more of the gripping members 126. Thereafter, the distal ends 132 of the gripping members 126 are moved axially inward to grip or clamp the work piece with jaws or the like which are attached to the distal ends 132. In general, the distal ends 132 of the gripping members 126 are moved inward or outward by pivoting or rotating the gripping members 126 about a pivot point or axis, which in a non-limiting embodiment, is a point or axis inside the first adjustment portion 142. In the embodiment shown, the pivot axis is the central axis of the rotational member 170. However, in alternative embodiments, the pivot axis could be located elsewhere and could be mobile.

In the particular embodiment shown, the distal ends 132 of the gripping members 126 are moved radially outward or inward by translating the actuator along the axis 44. By moving the actuator 20 in a first or upward direction, the annular camming surface 110 of the hole 108 in the flange 96 of the actuator 20 moves along the outer camming surface 178 of the slide member 172 and because the surfaces 110, 178 are angled with respect to the axis 44, the slide member 172 and hence the proximate end 130 and ball portion 144 are moved radially inward which causes the gripping member 126 to rotate around the pivot axis with the pin 170 and move the distal end 132 of the gripping member 126 radially outward. By moving the actuator 20 in a second or downward direction, the annular camming surface 110 of the hole 108 in the flange 96 of the actuator 20 moves along the outer surface 178 of the slide member 172 and because the surface 110, 178 are angled with respect to the axis 44, the slide member and hence the proximate end 130 and ball portion 144 are moved radially outward which causes the gripping member 126 to rotate around the pivot axis with the pin 170 and move the distal end 132 of the gripping member 126 radially inward.

In a non-limiting embodiment, the actuator 20 is translated along the axis 44 using a drawbar (not shown) or other member. In the embodiment shown, a fastener 350 extends through the hole 100 in the cylindrical portion 92 of the actuator 20 to selectively attach the actuator 20 to the drawbar. In the particular embodiment shown, the fastener 350 is a conventional bolt or machine screw, which is advanced into or fastened to a drawbar (not shown) in a conventional manner. Thereafter, the drawbar may be selectively used to translate the actuator 20 along the axis 44. It shall be recognized that, although the actuator 20 is intended for attachment to a mechanical drive such as the drawbar of a machine tool, it can easily be adapted for hydraulic or pneumatic operation.

Once attached, the chuck assembly 10 may be used to manipulate, move or rotate a workpiece. In particular, the chuck assembly 10 may rotate so that a workpiece, which is secured by the gripping members 126 may be altered, changed or otherwise worked upon. In a non-limiting embodiment, the chuck assembly 10 rotates about the central axis 44. As the chuck assembly 10 rotates, centrifugal force may tend to urge the gripping members 126 radially outward from the axis of rotation. In specific instances, the centrifugal force will urge the distal end 132 or cylindrical portion 134 of the gripping members 126 radially outward. However, in the embodiment shown, the counterweight 18 is also urged radially outward by the centrifugal force and the weight 18 contacts the proximate end 130 of the gripping member 126, thereby placing additional force urging the proximate end 130 radially outward. By urging the proximate end 130 radially outward, the additional force of the counter weight 18 places a rotational moment upon the gripping member 126 around the pivot axis or the pin 170 which urges the distal end 132 radially inward thereby resisting or "countering" the centrifugal force urging the distal end 132 radially outward. In this manner, the chuck assembly 10 shown in FIGS. 1, 2, and 3 provides the gripping members 126 with additional force to grip or secure workpieces in the chuck assembly 10.

In the embodiment shown, the counterweight 18 is disposed in the cavity 74 of the adapter plate 14 and the cavity 74 is slightly larger than the counterweight 18, which allows the counterweight 18 to translate slightly radially inward or outward and the clearance cavity 77 provide space for the distal end 130 to translate radially inward or outward. Furthermore, the counterweight 18 in the embodiment shown is not integrally attached to the gripping member 126 and the counter weight 18 only selectively contacts the proximate end 130 of the gripping member 126. However, it is specifically contemplated by the present invention that the counterweight 18 of the present invention could be integrally attached to the gripping member 126. Furthermore, the counterweight could have a convex surface, which fits, into a concave cavity of the adapter plate 14 or the body portion 12 thereby allowing the counterweight 18 to rotate with the proximate end 130 of the gripping member 126.

Alternatively, the counterweight could be disposed in an area other than the cavity 74 of the adapter plate 14. For example, the body portion 12 of the chuck assembly 10 may be configured differently to allow the counterweight to be disposed in the body portion 12.

It shall be recognized that the power chuck assembly 10 can be provided in various sizes, six inch, eight inch, etc. The power chuck assembly 10 may provide external and internal chucking with centralizing, compensating or off-on. The power chuck assembly 10 can also provide first and second chucking, ball joint construction, high power ratio, positive gripping force, increased jaw travel, sealed design, pullback action, built-in jaw swivel, and standard or quick-change jaws.

It should be understood that the invention is not limited to the exact embodiment or construction, which has been illustrated and described but that various changes may be made without departing from the spirit and the scope of the invention.

What is claimed is:

1. A power chuck assembly comprising:
   a body having a first and second opening and a central axis, said body configured for rotation about said central axis;
   a cam area extending between said first and second openings;
   a first gripping member which is disposed within said first opening and which is rotatably disposed about a first pivot axis, said first gripping member having a first end, a second end, and an adjustment portion radially disposed about said pivot axis, said first gripping member also including a first ball portion, said first pivot axis extending through said first ball portion, said first end being suitable for assisting in the support of a workpiece,
   a first counterweight operatively adjacent to said second end, said first counterweight having a first hole for receiving said second end of said first gripping member, said first hole at least partially defined by a double beveled surface of said first counterweight for assisting in allowing the first gripping member to rotate about the first pivot axis;
   said adjustment portion seated within said cam area, wherein said counterweight abuts said second end to slide said adjustment portion within said cam area, thereby rotating said first end about said pivot axis;
   a second gripping member which is disposed within said second opening and which is rotatably disposed about a second pivot axis, said second gripping member having a third end and a fourth end radially disposed about said second pivot axis, said second gripping member also including a second ball portion, said second pivot axis extending through said second ball portion, said third end being suitable for assisting in the support of said workpiece; and
   a second counterweight operatively adjacent to said fourth end, said second counterweight having a second hole for receiving said fourth end of said second gripping member, said second hole at least partially defined by a double beveled surface of said second counterweight for assisting in allowing the second gripping member to rotate about the second pivot axis.

2. A power chuck assembly as in claim 1 further comprising an adapter plate which includes a cavity suitable for receiving said first counter weight, said adapter plate being attached to said body.

3. A power chuck assembly as in claim 1, wherein said cam area includes a ball shaped surface having first and second portions for mating with said adjustment portion of said first gripping member.

4. A power chuck assembly as in claim 1, wherein said first and second counter weights respectively place a force upon said second and said fourth ends to resist a force place upon said first and said third ends when said assembly is rotating.

5. A power chuck assembly as in claim 1, further comprising an actuator which can be translated along said central axis.

6. A power chuck assembly as in claim 5, wherein the translation of the actuator along said central axis is effective to move said second end radially with respect to said central axis.

7. A power chuck assembly as in claim 1 wherein said first counterweight includes flanges.

8. A power chuck assembly comprising:
   a body having a first and second opening and a central axis, said body configured for rotation about said central axis;
   a cam area extending between said first and second openings;
   a gripping member disposed within said first opening and which is rotatably disposed about a pivot axis, said gripping member having a first end, a second end, and an adjustment portion radially disposed about said pivot axis, said first end being suitable for assisting in the support of a workpiece;
   a counterweight operatively adjacent to said second end, said counterweight including a pair of flanges extending generally perpendicular to said central axis, said counterweight having a hole for receiving said second end of said gripping member, said hole configured for assisting in allowing the gripping member to rotate about the pivot axis;
   said adjustment portion seated within said cam area, wherein said counterweight abuts said second end to slide said adjustment portion within said cam area, thereby rotating said first end about said pivot axis.

9. A power chuck assembly as in claim 8, further comprising an adapter plate which includes a cavity suitable for receiving said counterweight, said adapter plate being attached to said body.

10. A power chuck assembly as in claim 8, wherein said counterweight places a force upon said second end when abutting said second end to resist a force placed upon said first end when said assembly is rotating.

11. A power chuck assembly as in claim 8, further comprising
   an actuator which can be translated along said central axis.

12. A power chuck assembly as in claim 11, wherein the translation of the actuator along said central axis is effective to move said second end radially with respect to said central axis.

13. A power chuck assembly comprising:
   a body having a first and second opening and a central axis, said body configured for rotation about said central axis;
   an adapter plate attached to said body, said adapter plate having a first cavity and a second cavity wherein said first cavity and said second cavity each include a generally rectangular portion and a pair of flange portions;
   a first gripping member which is disposed within said first opening and which is rotatably disposed about a first pivot axis, said first gripping member having a first end, a second end, and a first adjustment portion radially disposed about said pivot axis, said first gripping member also including a first ball portion, said first pivot axis extending through said first ball portion, said first end being suitable for assisting in the support of a workpiece, said first pivot axis disposed substantially perpendicular to said central axis;

a first counterweight slidably disposed in said first cavity of said adapter plate operatively adjacent to said second end of said first gripping member, said first counterweight including a pair of flanges extending generally parallel to said first pivot axis, said pair of flanges of said first counterweight disposed in the flange portions of the first cavity of the adapter plate, said first counterweight having a first hole for receiving said second end of said first gripping member, said first hole at least partially defined by a double beveled surface of said first counterweight for assisting in allowing the first gripping member to rotate about the first pivot axis;

a second gripping member which is disposed within said second opening and which is rotatably disposed about a second pivot axis, said second gripping member having a third end and a fourth end and a second adjustment portion radially disposed about said second pivot axis, said second gripping member also including a second ball portion, said second pivot axis extending through said second ball portion, said third end being suitable for assisting in the support of said workpiece, said second pivot axis disposed substantially perpendicular to said central axis; and a second counterweight slidably disposed in said second cavity of said adapter plate operatively adjacent to said fourth end of said second gripping member, said second counterweight including a pair of flanges extending generally parallel to said second pivot axis, said pair of flanges of said second counterweight disposed in the flange portions of the second cavity of the adapter plate, said second counterweight having a second hole for receiving said fourth end of said second gripping member, said second hole at least partially defined by a double beveled surface of said second counterweight for assisting in allowing the second gripping member to rotate about the second pivot axis.

* * * * *